(12) United States Patent
Ogura et al.

(10) Patent No.: US 6,907,731 B2
(45) Date of Patent: Jun. 21, 2005

(54) MASTER CYLINDER APPARATUS

(75) Inventors: Tomoo Ogura, Chita-gun (JP);
Katsuhiro Mita, Gamagoori (JP)

(73) Assignee: Advics Co., Ltd., Kariya (JP)

( * ) Notice: Subject to any disclaimer, the term of this patent is extended or adjusted under 35 U.S.C. 154(b) by 46 days.

(21) Appl. No.: 10/703,439

(22) Filed: Nov. 10, 2003

(65) Prior Publication Data

US 2004/0144090 A1 Jul. 29, 2004

(30) Foreign Application Priority Data

| Nov. 11, 2002 | (JP) | ................................ 2002-326971 |
|---|---|---|
| Nov. 11, 2002 | (JP) | ................................ 2002-326984 |
| Dec. 3, 2002 | (JP) | ................................ 2002-350591 |
| Oct. 14, 2003 | (JP) | ................................ 2003-353896 |

(51) Int. Cl.[7] ............................................. B60T 13/56
(52) U.S. Cl. ..................... 60/547.1; 91/369.2; 91/376 R
(58) Field of Search ..................... 60/547.1; 91/369.2, 91/376 R

(56) References Cited

U.S. PATENT DOCUMENTS

| 4,505,114 A | * | 3/1985 | Haar | .......................... 60/547.1 |
|---|---|---|---|---|
| 4,667,567 A | * | 5/1987 | Morimoto | .................. 91/376 R |
| 4,738,108 A | * | 4/1988 | Kobayashi et al. | ......... 60/547.1 |
| 4,854,220 A | * | 8/1989 | Imayoshi | ................... 91/376 R |

FOREIGN PATENT DOCUMENTS

| JP | 56-154357 A | 11/1981 |
|---|---|---|
| JP | 2001-294138 A | 10/2001 |

* cited by examiner

Primary Examiner—Thomas E. Lazo
(74) Attorney, Agent, or Firm—Burns, Doane, Swecker & Mathis, L.L.P.

(57) ABSTRACT

A master cylinder apparatus is provided with a master cylinder and a booster. The booster comprises a booster shell whose interior is divided into a variable and constant pressure chambers. The master cylinder comprises a master piston inserted in a cylinder body. The cylinder body includes an installation flange to which the booster shell is attached. When the brake pedal is operated, a pull mechanism operates a control valve to communicate the variable-pressure chamber with atmosphere. The master piston is moved by an output member of the booster to generate a fluid pressure in the master cylinder that is delivered to wheel cylinders. The installation flange of the cylinder body can be attached to a dashboard so that the booster shell is disposed in the passenger room or the engine room, with the cylinder body protruding into the other room.

8 Claims, 6 Drawing Sheets

MASTER CYLINDER APPARATUS

INCORPORATION BY REFERENCE

This application is based on and claims priority under 35 U.S.C. sctn. 119 with respect to Japanese Application No. 2002-326971 filed on Nov. 11, 2002, No. 2002-326984 filed on Nov. 11, 2002, No. 2002-350591 filed on Dec. 3, 2002, and No. 2003-353896 filed on Oct. 14, 2003 the entire content of which is incorporated herein by reference.

BACKGROUND OF THE INVENTION

1. Field of the Invention

The present invention relates to a master cylinder apparatus with a booster that augments the stepping force on a brake pedal of a vehicle.

2. Discussion of the Related Art

Heretofore, there has been known a so-called pull-type master cylinder apparatus with a booster that augments the stepping force on a brake pedal of a vehicle to generate boosted brake fluid pressure by pulling a pull rod connected between the brake pedal and a control valve for regulating air flow to and from the booster, as described in Japanese unexamined, published application No. 56-154357 (1981-154357) and No. 2001-294138. In the first known apparatus, the booster includes a booster shell comprising front and rear shells that sandwich a periphery of a diaphragm to divide the interior of the booster shell into constant-pressure chamber and a variable-pressure chamber. The control valve that regulates the communication of the variable-pressure chamber with the constant-pressure chamber and the atmosphere is provided in a piston that is attached to the diaphragm. The booster is attached to a master cylinder that comprises a cylinder body and a master piston. The cylinder body is provided with a cylinder that opens to a front surface of the cylinder body to which the booster shell is air-tightly fixed. The master piston is slidably inserted in the cylinder and has the rear end thereof entering a constant-pressure chamber of the booster to make abutting engagement with an output member of the booster. A reaction force generating device is interposed between the piston and the output member to make a reaction force act on the pull rod. The pull rod is connected to the brake pedal at the one end and is connected at the other end to a valve body of the control valve through holes made in the cylinder body, the master piston and the piston respectively. And the pull-type master cylinder apparatus with the booster is disposed in a engine room, and the rear end surface of the master cylinder is brought in abutment with a front surface of a dashboard of a vehicle to be attached thereto.

However, in the first prior art pull-type master cylinder apparatus with the booster, as the pull rod connected to the brake pedal is connected to the valve body of the control valve through holes that are respectively made in the cylinder body, the master piston and the piston, it is disadvantageously required to use many seal members, which results in complication in configuration. In addition, the whole length of the master cylinder apparatus becomes long to worsen the flexibility in mounting the master cylinder apparatus on the vehicle, because the pull rod extends from the front end of the cylinder to the rear end of the booster through the holes made on the axis thereof. It also worsens th flexibility in mounting the master cylinder apparatus on the vehicle and makes the master cylinder apparatus to be prone to vibrate that the booster with a large diameter is fixed to the front end of the master cylinder which is attached to the dashboard at the rear end thereof in an engine room.

In the second prior art pull-type master cylinder apparatus with the booster, the booster is attached at the rear end thereof to the dashboard in the engine room, and the master cylinder is fixed to the front and of the booster.

In the second prior art pull-type master cylinder apparatus with the booster, as the rear end of the booster is attached to the dashboard to mount the master cylinder apparatus on the vehicle, the stepping force exerted on the brake pedal acts on the booster, therefore the booster shell of the booster is made thick to have enough strength to prevent the deformation thereof. This makes the booster or the master cylinder apparatus heavy and expensive.

SUMMARY OF THE INVENTION

Accordingly, it is a primary object of the present invention to provide an improved master cylinder apparatus with a booster that is capable of increasing flexibility in mounting the master cylinder apparatus on a vehicle, and capable of reducing the weight thereof.

Another object of the present invention is to provide an improved master cylinder apparatus with a booster that is capable of realizing easier assembling thereof and reduced manufacturing cost.

Briefly, according to the present invention, there is provided a master cylinder apparatus with a booster, comprising a booster shell; a partition member dividing the interior of the booster shell into a variable-pressure chamber and a constant-pressure chamber; a piston attached to the partition member for transmitting the movement in a front-rear direction of the partition member responsive to the pressure difference between the variable-pressure chamber and the constant-pressure chamber, to an output member; a control valve disposed in the piston to regulate the communication of the variable-pressure chamber with the constant-pressure chamber and the atmosphere; a cylinder body provided with a cylinder that opens to an end thereof and an installation flange at the same end to which the booster shell is attached; a master piston slidably inserted in the cylinder and connected to the output member; a reaction force generating device interposed between the piston and the output member to make a reaction force act on a valve body of the control valve; pull means connected to a brake pedal at one end and to the valve body at the other end. The installation flange is attached to a dashboard, so that the booster shell is disposed in one of a passenger room and an engine room and the cylinder body protrudes into the other room through an installation hole made through the dashboard.

With this configuration, when the brake pedal is stepped on, the pull means is pulled rearward to move the valve body relative to the piston. The control valve makes atmospheric air to be led to the variable-pressure chamber according to the movement of the valve body, whereby the pressure difference between the variable-pressure chamber and the constant-pressure chambers is brought about. The partition member and the piston are moved rearward in response to the pressure difference to move the output member through the reaction force generating device. The master piston is moved by the output member to generate a fluid pressure in the cylinder that is delivered to wheel cylinders of a brake system.

The installation flange of the cylinder body is attached to a dashboard, so that the booster shell is disposed in one of a passenger room and an engine room and the cylinder body protrudes into the other room, whereby the flexibility in mounting the master cylinder apparatus with the booster on the vehicle can be increased tremendously. Moreover, as the stepping force exerted on the brake pedal is supported by the flange attached to the dashboard and does not act on the booster, the thickness of the booster shell can be made thin without deformation and vibration thereof. As a result, simpler construction, easier assembling and reduced manufacturing cost of the master cylinder apparatus can advantageously be realized.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

Figure 1:
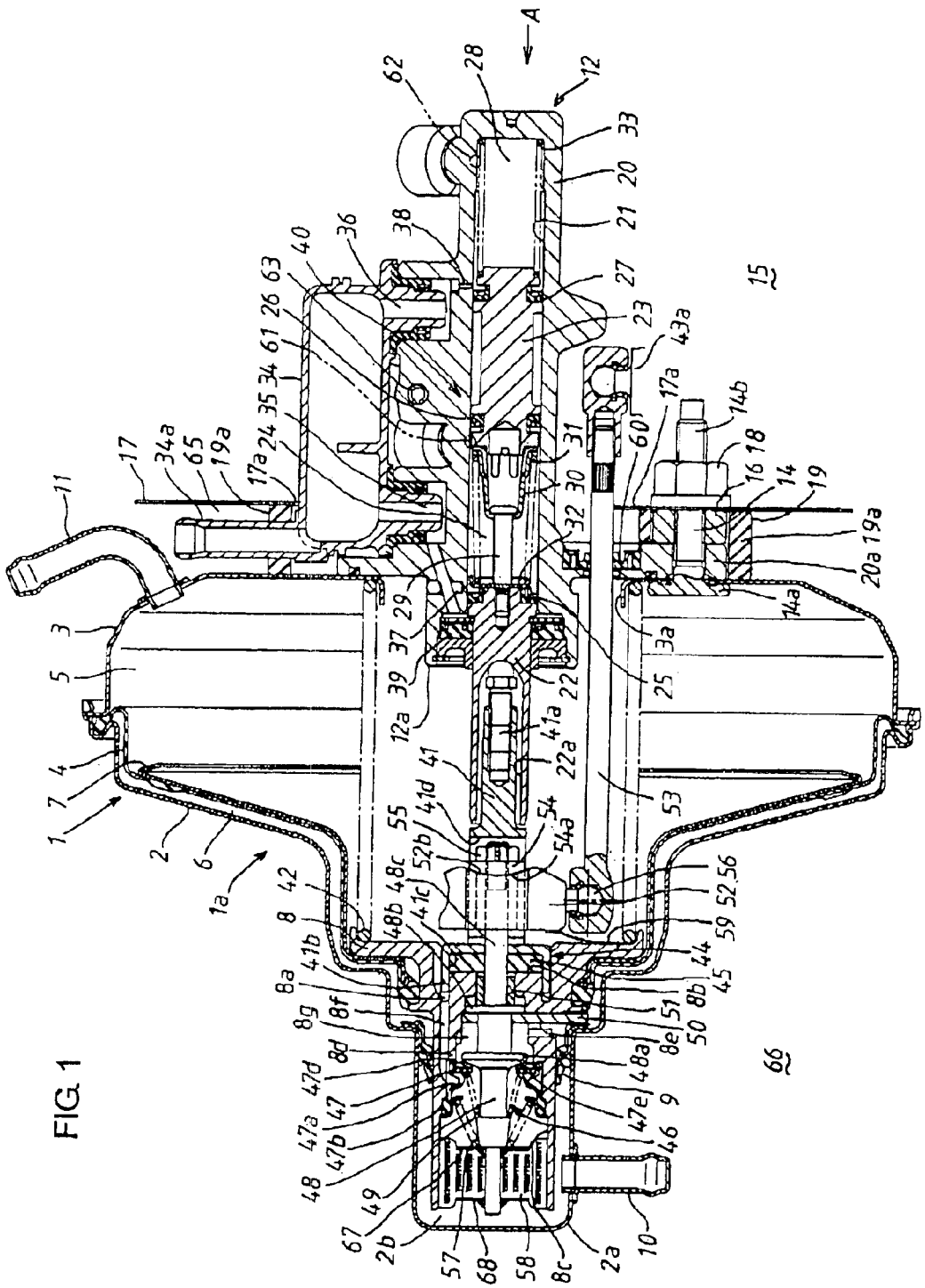
FIG. 1 is a longitudinal sectional view of a master cylinder apparatus with a booster according to the first embodiment of the present invention.
Figure 2:
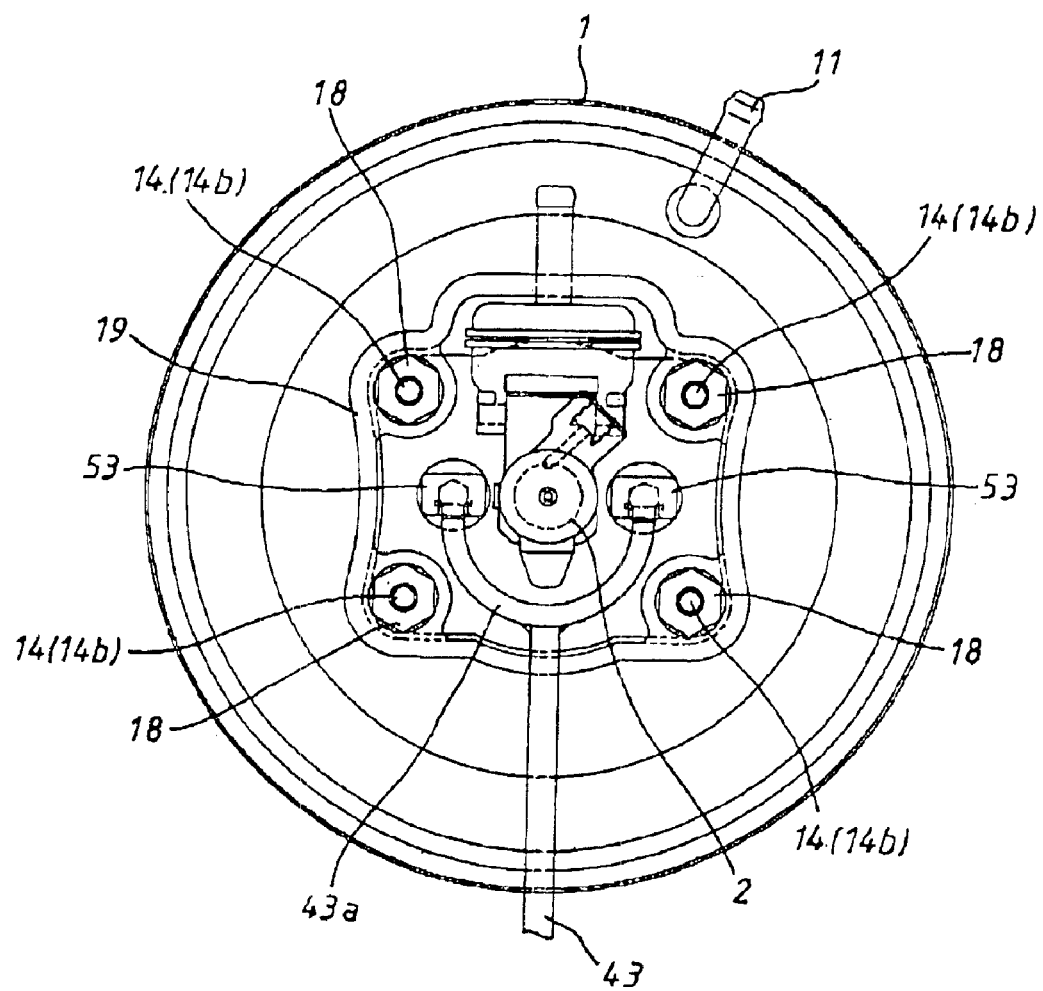
FIG. 2 is a view shown from an arrow A in FIG. 1.
Figure 3:
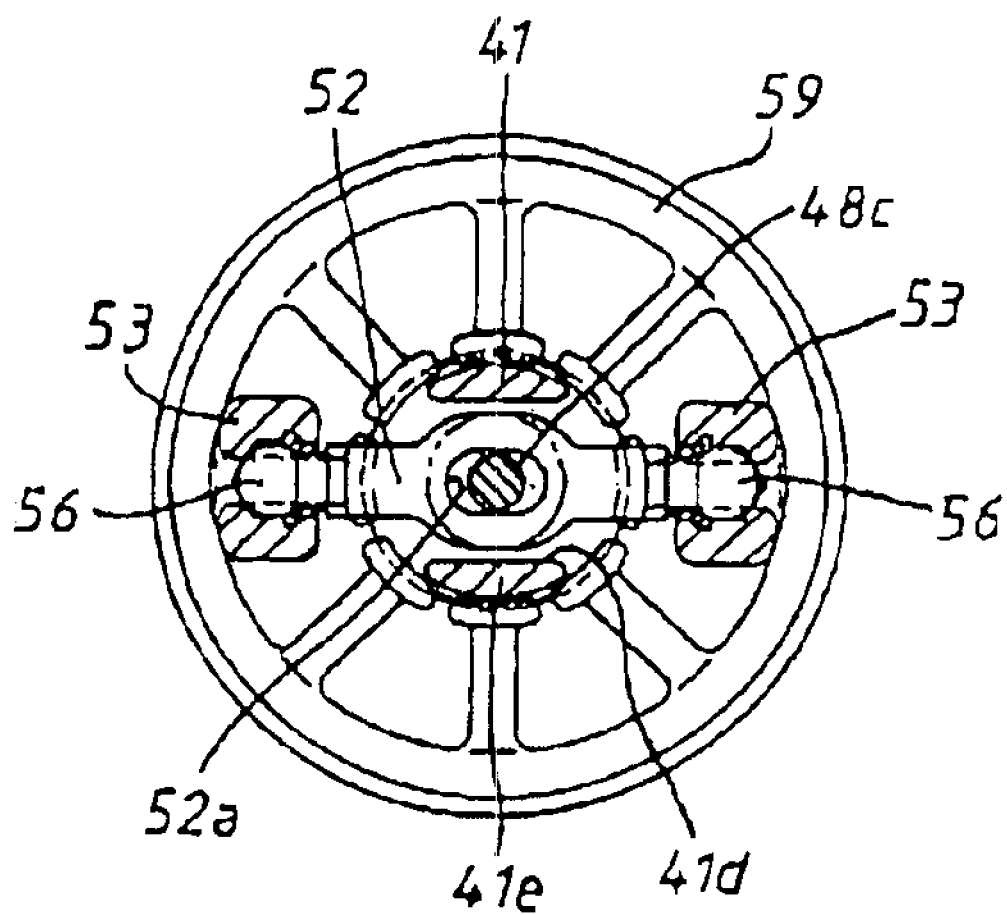
FIG. 3 is a sectional view showing connection of a balancing member to an input portion of a valve body at the center and to a pair of pull rods at both ends in the first embodiment.

Hereinafter, an embodiment of a master cylinder apparatus with a booster according to the present invention will be described with reference to the drawings. As shown in FIG. 1, a booster shell 1 of a booster 1a is composed of a front shell 2 defining a front wall and a rear shell 3 defining a real wall. Between the shells 2 and 3, a flexible diaphragm 4 is airtightly sandwiched at the peripheral bead and operates as a partition member which divides the interior of the booster shell 1 into a constant-pressure chamber 5 at the rear side and a variable-pressure chamber 6 at the front side.

A disc-like plate 7 is overlapped over the diaphragm 4 within the constant-pressure chamber 5. A piston 8 is airtightly secured at an external surface of its rear end portion to center holes formed on the diaphragm 4 and the plate 7. The rear end of the piston 8 is exposed within the constant-pressure chamber 5. The front shell 2 is provided at the center thereof with a cylindrical projection 2a protruding forward which has an intake chamber 2b on its axis. The front portion of the piston 8 is accommodated in the intake chamber 2b, and an air-tight seal member 9 is interposed between the internal surface of the intake chamber 2b and the external surface of the piston 8 to seal the variable-pressure chamber 6 from the intake chamber 2b. An atmospheric air inlet pipe 10 is secured to the cylindrical projection 2a to introduce the atmospheric air into the intake chamber 2b. A negative pressure inlet pipe 11 is secured to the rear shell 3. The constant pressure chamber 5 is in communication with an intake manifold of an engine through the negative pressure inlet pipe 11 and is maintained at the negative pressure of a certain level.

A cylinder body 20 of a master cylinder 12, whose front end 12a passes through a center hole 3a formed on the rear shell 3 protrudes within the constant-pressure chamber 5 air-tightly. An installation flange 20a of the cylinder body 20 is in abutment with the rear surface of the rear shell 3 with a seal ring being interposed therebetween. Four flanged bolts 14 attached to the rear shell 3 protrude rearward into a passenger room 15. The flanges 14a of the bolts 14 are in abutment with the internal surface of the rear shell 3, and male screws 14b of bolts 14 extend rearward through rear shell 3. The bolts 14 are air-tightly secured to the rear shell 3 by caulking the neck portions thereof to the rear shell 3. The male screws 14b of the bolts 14 extend through bolt holes formed at the corners of the installation flange 20a. By fastening up nuts 16 that engage the male screws 14b of the bolts 14, the rear shell 3 is air-tightly fixed to the front surface of the cylinder body 20. The master cylinder 12 enters the passenger room 15 through an installation hole 17a formed through a dashboard 17. The rear surfaces of the nuts 16 are in abutment with the front surface of the dashboard 17 outside the passenger room 15. By fastening up nuts 18 that engage male screws 14b of the bolts 14 that extend through the dashboard 17 with washers being interposed between the nuts 18 and the dashboard 17, the installation flange 20a is attached to a dashboard 17, so that the booster shell 1 is disposed in the engine room 66 and the cylinder body 20 protrudes into the passenger room 15 through an installation hole 17a made through the dashboard 17.

An elastic seal member 19 for fluid-tightly sealing the installation hole 17a is interposed between the rear shell 3 and the dashboard 17. The seal member 19 is provided with peripheral loop portion 19a surrounding the installation flange 20a, the nuts 16 and the installation hole 17a. The opposite end surfaces of the peripheral loop portion 19a are in fluid-tight abutment with the rear surface of the rear shell 3 and the front surface of the dashboard 17 to prevent water from entering into the passenger room 15. The seal member 19 is made of rubber, aluminum covered with rubber, resin or other elastic material.

The cylinder body 20 is formed with a cylinder 21 that is in co-axial relation with the booster shell 1. The cylinder 21 opens to the constant-pressure chamber 5 at the front end, and has a bottom at the rear end. First and second piston 22, 23 are slidably inserted in the cylinder 21 in line with the first piston 22 being positioned at the opening side of the cylinder 21. The front portion of the first piston 22 enters into the constant-pressure chamber 5 by fluid-tightly passing through a seal member 39 secured to the front surface of the cylinder body 20 to which the cylinder 21 opens. A first cup seal 25 is mounted on a rear end portion of the first piston 22, and a second cup seal 26 is mounted on a front end portion of the second piston 23 to partition the cylinder 21 as a first fluid pressure chamber 24 from which pressurized fluid is supplied to a first brake system (not shown). A third cup seal 27 is mounted on a rear end portion of the second piston 23 to partition the bottom portion of the cylinder 21 as a second fluid pressure chamber 28 from which pressurized fluid is supplied to a second brake system (not shown).

In FIG. 1, the operating fluid pressurized within the first and second fluid pressure chamber 24 and 28 is supplied through the first and second ports 61, 62 to brake tubes that are laid in the passenger room 15 and are extended through the dashboard 17 to be connected to the wheel cylinders (not shown), so that the pressurized fluid is supplied to the wheel cylinders.

It is possible to form passages in the cylinder body 20 that substitute for brake tubes laid in the passenger room 15 and open to the exterior of the cylinder body 20 in a space 65 between the rear shell 3 of the booster 1a and the dashboard 17 to make ports corresponding to the first and second ports 61, 62, thereby to supply the pressurized fluid to the wheel cylinders. In this configuration, as the brake tubes are not laid in the passenger room 15, it does not happen that the passenger room 15 is made dirty by the leakage of the operating fluid. And as the brake tubes do not extend through the dashboard 17, seal members are not necessary for fluid-tightly sealing between brake tubes and dashboard 17, and troublesome piping out of the passenger room 15 becomes unnecessary.

From the rear end surface of the first piston 22, there is protruded rearward a rod 29 which is provided with an engagement portion at the rear end thereof. A numeral 30 denotes a spring seat of a bell shape, which is guided by the rod 29 at a hole formed at the front end thereof and which is in engagement with the engagement portion of the rod 29, so that the spring seat 30 is restrained from moving rearward. A numeral 31 denotes a first compression spring interposed between a flange which is expanded radially outwardly at the rear end of the spring seat 30 and the rear end surface of the first piston 22. The first compression spring 31 urges the spring seat 30 rearward by a first set spring force until the spring seat 30 is engaged with the engagement portion of the rod 29. A numeral 33 denotes a second compression spring interposed between the second piston 23 and the bottom surface of the cylinder 21. The second compression spring 33 urges the second piston 23 forward by a second set spring force smaller than the first set spring force and brings the second piston 23 into engagement with the spring seat 30. In this way, the first and second piston 22, 23, the rod 29, the spring seat 30, the first compression spring 31 and the like constitute a master piston 40 which is slidably inserted in the cylinder 21 and protrudes into the constant-pressure chamber 5 at the front end portion thereof. The master cylinder 12 comprises the cylinder body 20, the master piston 40, the cup seals 25 through 27 and so forth.

A reservoir 34 is mounted on the top of the cylinder body 20 and is secured thereto by means of a pin 63. First and second output ports 35, 36 formed at the lower surface of the reservoir 34 are in fluid communication respectively with first and second supply ports 37, 38 which open to the top surface of the cylinder body 20 for replenishing the operating fluid to the first and second fluid pressure chambers 24, 28. The first and second supply ports 37, 38 open to the first and second fluid pressure chamber 24, 28 when the first and second piston 22, 23 are positioned at the inoperative position. The front portion of the reservoir 34 to which a reservoir pipe 34a is secured extends into the space inside the peripheral loop portion 19a of the seal member 19 through the installation hole 17a. The reservoir pipe 34a extends air-tightly to the atmosphere through the peripheral loop portion 19a of the seal member 19 that is interposed between the rear surface of the rear shell 3 and the front surface of the dashboard 17.

An output member 41 is interposed between the piston 8 and the first piston 22. The piston 8 operates to transmit the rearward movement of the diaphragm 4 that is responsive to the pressure difference between the constant-pressure chamber 5 and the variable-pressure chamber 6, to the first piston 16 through the output member 41. Namely, a connection hole 22a is formed in the first piston 22 extending from the front end surface of the third piston 22 in the axial direction. The bottom of the connection hole 22a defines a conical space whose top is rounded. The output member 41 is formed with a rod portion 41a that is in pivotable abutment at the tip thereof with the rounded bottom surface of the connection hole 22a, so that the rod portion 41a is automatically brought into alignment with the first piston 22. An annular projection 41b formed at the front end of the output member 41 is axially movably fit in an annular recess 8a that is formed in the piston 8 to extend forward from the rear end surface thereof. A return spring 42 is interposed between the rear shell 3 and the rear end surface of the piston 8 to urge the piston 8 forward.

A reaction force generating device 44 is interposed between the piston 8 and the output member 41 to make reaction force act on a valve body 48 of a control valve 46. When the control valve 46 is operated upon the stepping-on of a brake pedal 43, a pressure difference between the constant-pressure chamber 5 and the variable-pressure chamber 6 is generated to urge the diaphragm 4 or the piston 8 rearward, as will be described hereinafter. The reaction force generating device 44 has a disc-like reaction force member 45 made of an elastic material that is received in a reaction force chamber 41c surrounded by the annular projection 41b of the output member 41. The reaction force member 45 is interposed between a reaction force end surface 8b surrounded by the annular recess 8a of the piston 8 and the bottom surface of the reaction force chamber 41c. The reaction force member 45 is compressively deformable by the force that the piston 8 exerts on the output member 41 or the first piston 22.

The control valve 46 is disposed in the piston a and regulates the communication of the variable-pressure chamber 6 with the constant-pressure chamber 5 and the atmosphere. An annular valve seat member 47 is disposed in a valve hole 8c that is formed at the rear portion of the piston 8 in the axial direction. An annular valve seat member 47 is bodily connected at the front end thereof to a bellows 47a that permits the axial movement of the valve seat member 47, and the circular portion 47b of the bellows 47a is air-tightly fit in the valve hole 8c and is urged by a compression spring 57 to the shoulder formed at the center portion of the valve hole 8c.

A negative pressure valve seat 47d is formed on the outer periphery of the rear end surface of the valve seat member 47. The valve hole 8c is reduced in diameter to form a negative pressure valve portion 8d of an annular shape at the rear end portion of the valve hole 8c. The negative pressure valve seat 47d is brought into abutment with a negative pressure valve portion 8d when the valve seat member 47 moves rearward relative to the piston 8. A recess 8g that extends rearward from the inner periphery of the negative pressure valve portion 8d communicates to the variable-pressure chamber 6 through a hole 8e formed radially in the piston 8 to open to the exterior surface of the piston 8 at the position more rearward than the air-tight seal member 9. The piston 8 is formed with a passage 8f that opens at one end to the space partitioned by the outer surface of the bellows 47a from the valve hole 8c and at the other end to the rear end surface of the piston 8 so that the negative pressure within the constant pressure chamber 5 is led to the variable-pressure chamber 6 via the passage 8f when the forward movement of the valve seat member 47 causes the negative pressure valve seat 47d to depart from the negative pressure valve portion 8d.

A valve body 48 is disposed on the axis of the piston 8 movably in the front-rear direction relative to the piston 8. The middle portion of a large diameter of the valve body 48 is in the recess 8g, and the front portion protrudes forward from the middle portion through the annular seat member 47 into the valve hole 8c, and a rear portion protrudes rearward from the middle portion into the constant-pressure chamber 5. An air valve portion 48a is formed in the form of a closed loop or an annulus at the front surface of the middle portion of the valve body 48. A compression spring 49 interposed between the front surface of the valve seat member 47 and a shoulder formed on the front portion of the valve body 48, urges the valve body 48 forward to bring the air valve portion 48a into abutment with a air valve seat 47e that is formed on the inner periphery of the rear end surface of the annular valve seat member 47. When the air valve portion 48a departs from the air valve seat 47e, the atmospheric air is led to the variable-pressure chamber 6 via an air filter 58, the valve hole 8c, the recess 8g and the hole 8e. Retainers 67, 68 secured to the front portion of the valve body 48 at the front end thereof and the air filter 58 sandwiched between the retainers 67, 68 are fit in the front portion of the valve hole 8c. The compression spring 57 is interposed between the retainer 67 and the circular portion 47b of the bellows 47a.

A numeral 50 denotes a stop member that is inserted radially in the hole 8e and is movable relative to the piston 8 by a predetermined amount in an axial direction. The stop member 50 protrudes radially outwardly from the exterior surface of the piston 8, and is brought into abutting engagement with the inner shoulder portion of the cylindrical projection 2a formed on the front shell 2 to stop the forward movement of the piston 8 when the piston 8 is moved forward by resilient force of the return spring 42. The stop member 50 is brought into abutting engagement with a flange 48b formed on the rear portion of the valve body 48 to stop the forward movement of the valve body 48 relative to the piston 8. The booster 1a comprises the booster shell 1, the diaphragm 4, the piston 8, the control valve 46, the output member 41, the reaction force generating device 44 and so forth.

The rear portion of the valve body 48 is formed with the flange 48b and an input portion 48c which protrudes from the flange 48b into the constant-pressure chamber 5 through the reaction force member 45 and the front end of the output member 41. Namely, an annular push member 51 that is slidably fit on the input portion 48c between the flange 48b and the reaction force member 45 is slidably fit in a hole formed on the bottom of the recess 8g and opening to a reaction surface 8b of the piston 8. The annular push member 51 is brought into abutting engagement with the flange 48b at one end and with the reaction force member 45 elastically at the other end to make a reaction force act on the valve body 48 or the input portion 48c when the input portion 48c is pulled rearward. The output member 41 is formed with a wide portion 41e between the annular projection 41b and the rod portion 41a, and an hole 41d elongated in the axial direction of the output member 41 is formed through the wide portion 41e in a diametrical direction of the booster shell 1.

The input portion 48c axially extends into the elongated hole 41d in the constant-pressure chamber 5 to be connect d to the center portion of a balancing member 52 which extends equally on both sides through the elongated hole 41d in a diametrical direction of the booster shell 1. The balancing member 52 is formed with a through hole 52a on a center portion thereof in which the input portion 48c is loosely fit and a spherical concave seat 52b on the rear surface of the center portion thereof. A connecting member 54 which is formed with a spherical convex portion 54a engaging with the spherical concave seat 52b is attached to the rear end of the input portion 48c by a nut 55 screwed on the rear end of the input portion 48c. The balancing member 52 is disposed close to the piston 8 to make a distance small between a rear surface of the piston 8 exposed to the constant-pressure chamber 5 and a front surface of the balancing member 52. An annular spring member 59 is interposed between the return spring 42 and the rear surface of the piston B. The annular spring member 59 is in abutment with the balancing member 52 and urges the balancing member 52 rearward by the resilient force thereof to make the balancing member 52 normally contact with the spherical convex portion 54a of the connecting member 54 attached to the input portion 48c. The balancing member 52 is well kept in a normal position by such a simple structure of interposing the annular spring member 59 between the return spring 42 and the rear surface of the piston 8.

Figure 4:
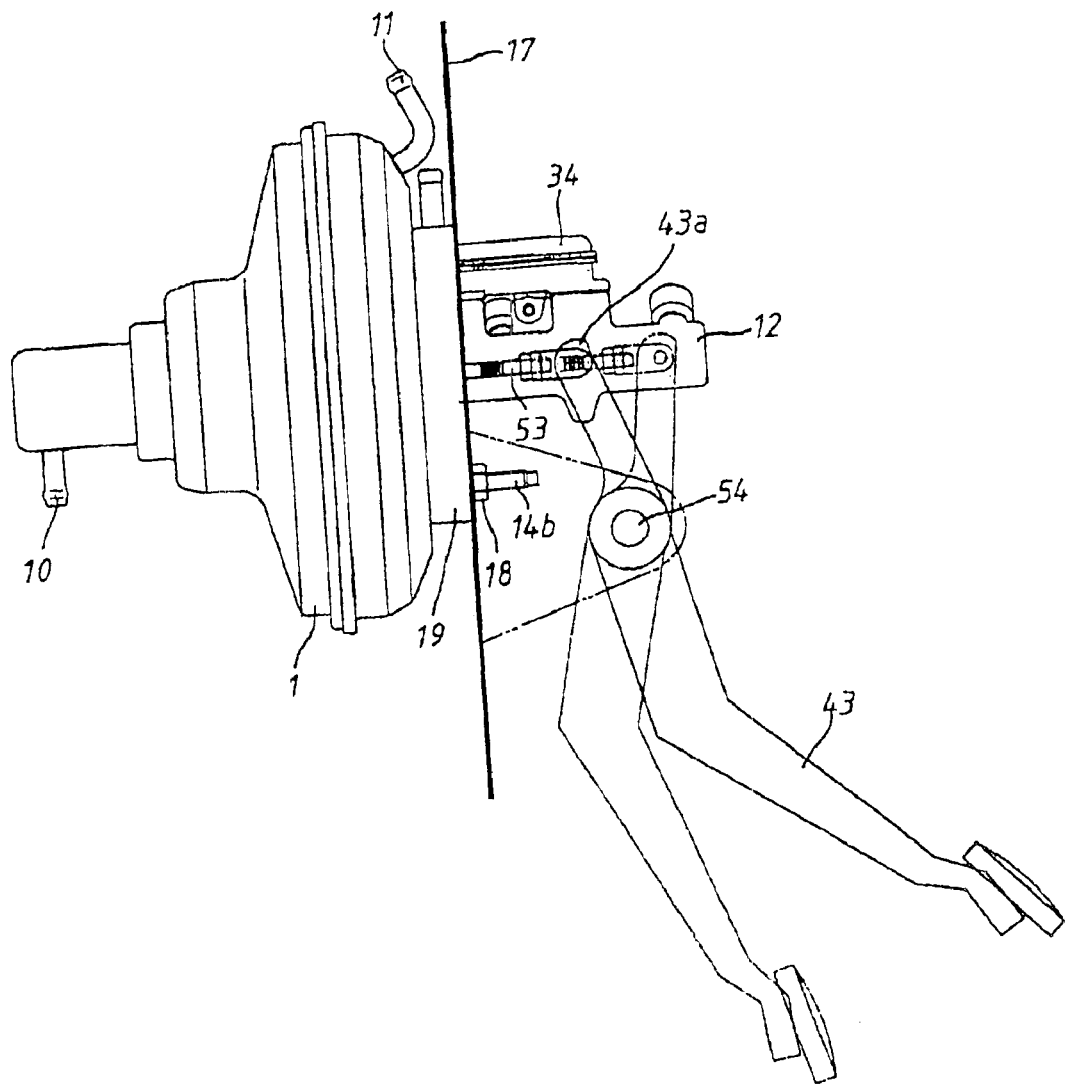
FIG. 4 is a side view of the master cylinder apparatus attached to a dashboard of a vehicle in the first embodiment.

Respective pull rods 53 that are disposed on both sides of the cylinder body 20 in parallel relation therewith are pivotally connected to the balancing member 52 at both ends thereof by spherical bearing 56, and extend through the flange 20a of the cylinder body 20, with keeping air-tight sealing between pull rods 53 and the flange 20a by seal members 60 interposed therebetween. As shown in FIG. 4, a brake pedal 43 is pivotably mounted on the dashboard 17 by a pin 64 at the middle portion thereof, and respective ends of a fork portion 43a formed at the upper end of the brake pedal 43 are pivotally connected to the pull rods 53.

(Operation of the First Embodiment)

The operation of the master cylinder apparatus as constructed above will be described hereinafter. When the brake pedal 43 is stepped on forward, the brake pedal 43 is swiveled around the pin 64 to pull two pull rods 53 rearward. Two pull rods 53 pull the balancing member 52 rearward by the both ends thereof by means of the respective spherical bearings 56. The spherical concave seat 52b pushes the spherical convex portion 54a to move the input portion 48c rearward. As positional errors of the input portion 48c, the balancing member 52 and two pull rods 53 are absorbed by the self-adjustment movement of the spherical concave seat 52b relative to the convex spherical portion 54a, the input portion 48c or the valve body 45 is smoothly moved rearward by the balancing member 52.

When the valve body 48 is moved rearward relative to the piston 8 against the resilient force of the compression spring 49 and 57, the air valve portion 48a is forced to come off the air valve seat 47e of the valve seat member 47, so that the atmospheric air that is introduced to the intake chamber 2b through the atmospheric air inlet pipe 10 and is filtered by the air filter 58 flows into the variable pressure chamber 6 through the hole 8e. In response to the pressure difference between the variable-pressure chamber 6 and the constant-pressure chamber 5, the diaphragm 4, together with the plate 7 and the piston 8 fixed thereto, is moved rearward and the output member 41 is moved rearward by the piston 8 through the reaction force member 45 of the reaction force generating device 44, so that the first piston 22 is pushed by the output member 41.

The first and second pistons 22, 23 are moved rearward with the rod 29, the spring seat 30 and the first compression spring 31 being interposed therebetween, and the first and second supply ports 37, 38 are closed by the first and third cup seal member 25, 27. After the first and second supply ports 37, 38 are closed, the first and second pistons 22, 23 are moved to increase the pressure of the operating fluid within the first and second fluid pressure chambers 24 and 28, so that the increased fluid pressure is supplied from ports 61, 62 to the first and second brake systems.

The piston 8 elastically deforms the reaction force member 45 with the force whose strength corresponds to the difference between the pressures acting on the both surfaces of the diaphragm 4, and pushes the first piston 22 through the output member 41 while moving rearward relative to the valve body 48. When the piston 8 pushes the output member 41 with the force that meets the stepping force exerted on the brake pedal 24, the air valve seat 47e is brought into abutment with the air valve portion 48a thereby to block the fluid communication of the variable-pressure chamber 6 with the atmosphere, whereby the braking pressure is maintained at a value depending on the force exerted on the brake pedal 24.

At the same time with this, the force with which the brake pedal 24 is stepped on is transmitted to the reaction force member 45 from the input portion 48c through the flange 4b and the annular push member 51. Since this causes the reaction force member 45 to be deformed in dependence on the pedal stepping force, the driver can feel the reaction force. Even if the connection between the balancing member 52 and one of two pull rods 53 is cut off by breakage of some parts, the other pull rod can pull the input portion 48c or the valve body 48 through the balancing member 52 that will be brought into abutment with the rear surface of the piston 8 because the distance between the rear surface of the piston 8 exposed to the constant-pressure chamber 5 and the front surface of the balancing member 52 is made small.

When the brake pedal 43 is released, the valve body 48 is moved forward by the force of the compression spring 49, 57 relative to a piston 8 to bring the air valve portion 48a into abutment with the air valve seat 47e and to separate the negative pressure valve seat 47d from the negative pressure valve portion 8d. This permits the negative pressure within the constant-pressure chamber 5 to be led to the variable-pressure chamber 6 via the passage 8f and the hole 8e, whereby the pressure difference between the variable-pressure chamber 6 and the constant-pressure chambers 5 is lost. The piston 8, the plate 7 and the diaphragm 4 are moved forward by the force of the return spring 42, and the first and second piston 22, 23 are moved forward by the force of the first and second compression spring 31, 33 to depressurize the first and second fluid pressure chamber 24. The valve body 48 is stopped from moving forward at the same time when the stop member 50 is brought into abutment with the inner shoulder portion of the cylindrical projection 2a. The piston 8 is moved forward a little to be brought into abutment with the stop member 50, and this brings the negative pressure valve portion 8d into abutment with the negative pressure valve seat 47d, whereby the fluid communication between the constant-pressure chamber 5 and the variable-pressure chamber 6 is shut off.

In the master cylinder apparatus, a rear shell 3 of the booster shell 1 is in abutment with the front surface of the installation flange 20a and is air-tightly fixed to the installation flange 20a by the nuts 16 engaging with the bolts 14 fixed to the rear shell 3. The master cylinder 12 is attached to the dashboard 17 by the nuts 18 engaging with th bolts 14. The elastic seal member 19 provided with peripheral loop portion 19a surrounding the installation flange 20a and the installation hole 17a is interposed between the rear shell 3 and the dashboard 17 to fluid-tightly seal the installation hole 17a, thereby to be able to make an enough space 65 between the booster 1a and the dashboard 17 to easily lay pipes such as brake tubes into and out of the passenger room 15.

Further, as the reservoir pipe 34a secured to a reservoir 34 of the master cylinder 12 extends air-tightly to the atmosphere through the peripheral loop portion 19a of the seal member 19, it is capable to put operating fluid into the reservoir 34 outside of the passenger room 15.

The above-mentioned master cylinder apparatus with the booster 1a is made simple in configuration and short in length by disposing the pull rods 53 for connecting the brake pedal 43 to the valve body 48 of the control valve 46 in parallel to the cylinder body 20 to increase the flexibility in mounting the master cylinder apparatus on the vehicle. The seal members that are air-tightly mounted on the pull means are decreased in quantity, so that simpler construction for partitioning, easier assembling of the apparatus and reduced manufacturing cost can advantageously be realized.

(Second Embodiment)

Figure 5:
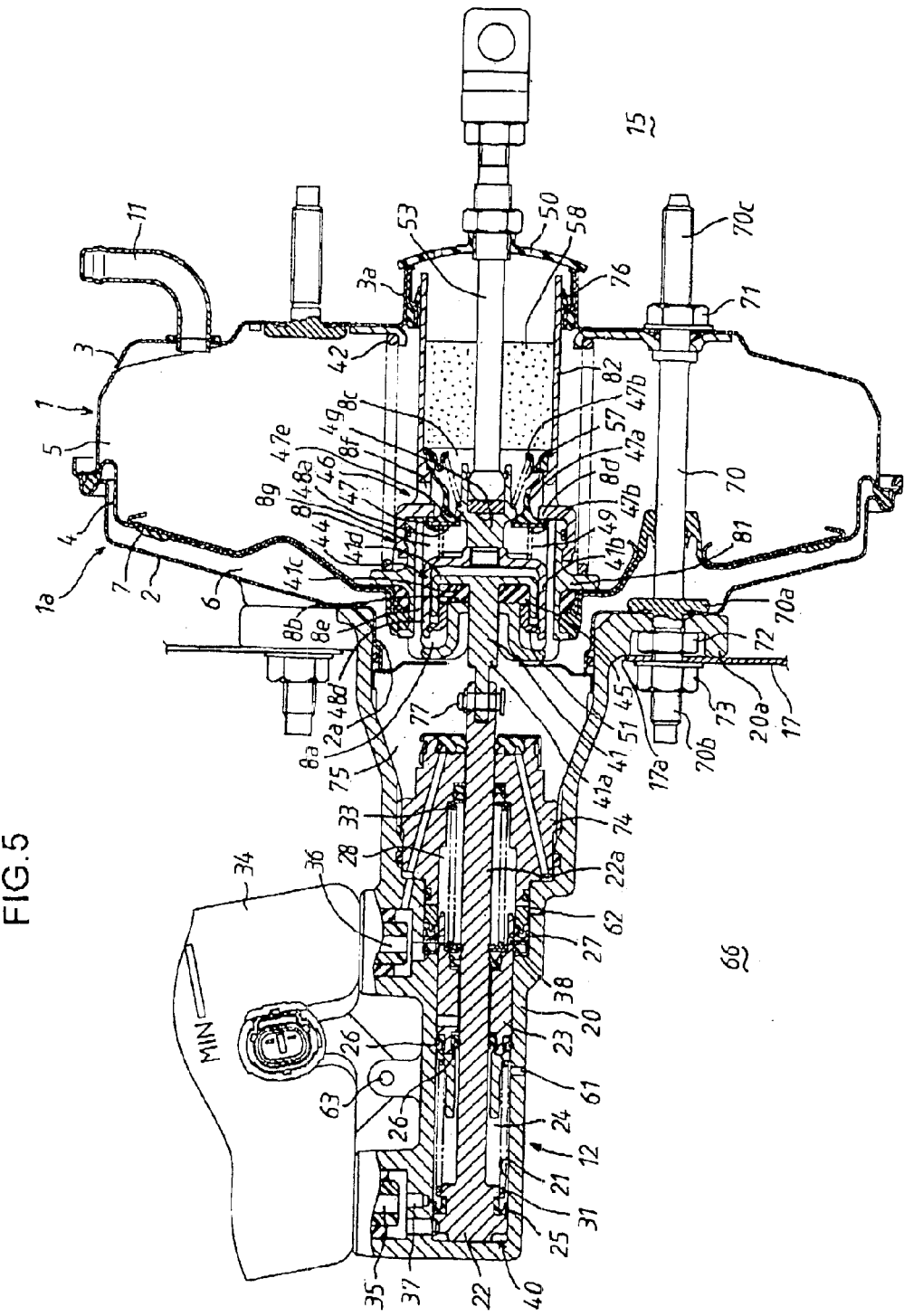
FIG. 5 is a longitudinal sectional view of a master cylinder apparatus with a booster according to the second embodiment of the present invention.
Figure 6:
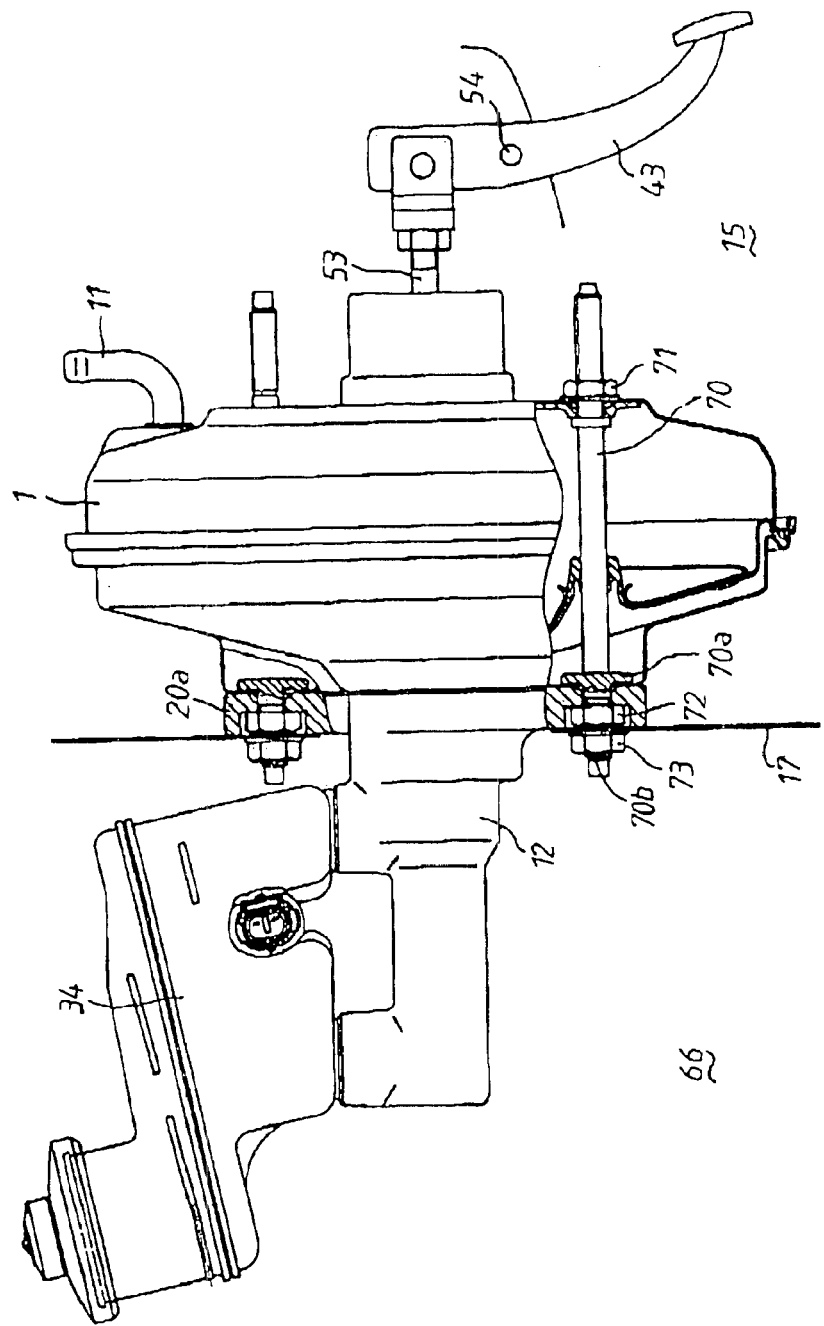
FIG. 6 is a side view of the master cylinder apparatus attached to a dashboard of a vehicle in the second embodiment.

Next, the second embodiment will be described with reference to FIGS. 5 and 6. As many parts and components in the second embodiment are identical or corresponding in configuration and function to those in the first embodiment, the parts and the components of the second embodiment are denoted in FIGS. 5 and 6 by the same reference numerals that denote the identical or corresponding parts and components of the first embodiment in FIGS. 1 and 4.

The main different points of the second embodiment from the first embodiment is that an installation flange 20a which is formed on a cylinder body 20 at the rear end thereof is attached to a dashboard 17 in a passenger room 15, so that a booster shell 1 is disposed in the passenger room 15 and the cylinder body 20 protrudes into an engine room 66; furthermore, in the second embodiment, a pull rod 53 is connected to a brake pedal 43 at one end and directly to a valve body 48 of a control valve 46 at the other end, and a master piston 40 of a master cylinder 12 is pulled by an output member 41 of a booster 1a to generate a fluid pressure in a cylinder 21 in which the master piston 40 is inserted.

Front and rear shells 2 and 3 are joined to form a booster shell 1 by two tie-rods 70 that are air-tightly secured to the front shell 2 by caulking with flanges 70a formed on the tie-rods 70 being abutment with the internal surface of the front shell 2. The respective tie-rods 70 extend forward through the front shell 2 and rearward air-tightly through a diaphragm 4 and rear shell 3. By fastening up nuts 71 that engage male screws 70c formed on the rear and portions of the tie-rods 70, the rear shell 3 is joined to the front shell 2 to form the booster shell 1.

The installation flange 20a is formed on the cylinder body 20 at the rear end thereof. The front surface of the front shell 2 is in air-tight abutment with the rear end surface of the installation flange 20a. The male screws 70b formed on the front end portion of the tie-rods 70 extend through bolt holes formed at the corners of the installation flange 20a. By fastening up nuts 72 that engage the male screws 70b, the front shell 2 is air-tightly fixed to the rear end surface of the cylinder body 20. The master cylinder 12 enters the engine room 66 through an installation hole 17a formed through a dashboard 17. The front surface of the installation flange 20a is in abutment with the rear surface of the dashboard 17 inside the passenger room 15. By fastening up nuts 73 that engage male screws 70b extending through the dashboard 17 into the engine room 66, the installation flange 20a is attached to a dashboard 17, so that the booster shell 1 is disposed in the passenger room 15 and the cylinder body 20 protrudes into the engine room 66 through an installation hole 17a made through the dashboard 17.

The cylinder body 20 is formed with a cylinder 21 that is in co-axial relation with the booster shell 1 and has a bottom at the front end. An end member 74 is fluid-tightly fixed to a rear hole 75 that is in co-axial relation with the cylinder 21 and has a larger diameter than the cylinder 21, so that the end member 74 encloses the rear end of the cylinder 21. The rear hole 75 communicates with the variable-pressure chamber 6 through a center hole 2a formed on the front shell 2. First and second piston 22, 23 are slidably inserted in the cylinder 21 in line with the first piston 22 being positioned at the bottom side of the cylinder 21. A piton rod 22a that protrudes from the rear end of the first piston 22 extends fluid-tightly through center holes formed in the second piston 23 and the end member 74 into the rear hole 75. Compression springs 31 is interposed between the first and second pistons 22 and 23, and compression springs 33 is interposed between the second piston 23 and the end member 74, so that the second piston 23 is positioned at the inoperative position when the brake pedal 43 is released.

A piston 8 is composed of a front portion 81 that is air-tightly secured to center holes formed on the diaphragm 4 and the plate 7 and a rear portion 82 that is fit on the front portion 81 and fixed thereto by caulking. The rear end of the rear portion 82 projects into the atmosphere through a cylindrical projection 3a formed on the rear shell 3 and an air-tight seal member 76 is interposed between the cylindrical projection 3a and the external surface of the rear portion 82 to seal the constant-pressure chamber 5 from the atmosphere.

The control valve 46 is disposed in the piston 8 and regulates the communication of the variable-pressure chamber 6 with the constant-pressure chamber 5 and the atmosphere. An annular valve seat member 47 is disposed in a recess 8g that is formed in the front portion 81 of the piston 8 in the axial direction. An annular valve seat member 47 is bodily connected at the rear end thereof to a bellows 47a, and the circular portion 47b of the bellows 47a is air-tightly fixed to a valve hole 8c made in the rear portion 82. An air filter 58 is fixed to the rear portion of the valve hole 8c. A negative pressure valve seat 47d is formed on the outer periphery of the rear end surface of the valve seat member 47. The valve hole 8c of the rear portion 82 is reduced in diameter to form a negative pressure valve portion 8d of an annular shape at the contacting portion with the rear end of the front portion 81. A recess 8g that extends forward from the negative pressure valve portion 8d communicates to the variable-pressure chamber 6 through a hole 8e formed axially in the front portion 81 to open to the front end surface thereof in the variable-pressure chamber 6. The rear portion 82 is formed with a passage 8f that opens at one end to the space partitioned by the outer surface of the bellows 47a from the valve hole 8c and at the other end to the exterior surface of the rear portion 82 at the position more frontward than the air-tight seal member 76.

A valve body 48 is disposed on the axis of the piston 8 movably in the front-rear direction relative to the piston 8. The middle portion of a large diameter of the valve body 48 is in the valve hole 8c, and the front portion protrudes forward from the middle portion through the annular seat member 47 into the recess 8g, and a rear portion protrudes rearward from the middle portion to be connected to a pull rod 53 by means of a ball joint. An air valve portion 48a is formed in the form of a closed loop or an annulus at the front surface of the middle portion of the valve body 48. A compression spring 49 interposed between the front surface of the valve seat member 47 and a cup shape portion 48d bodily fixed to the front portion of the valve body 48, urges the valve body 48 forward to bring the air valve portion 48a into abutment with an air valve seat 47e that is formed on the inner periphery of the rear end surface of the annular valve seat member 47. The compression spring 57 is interposed between the rear surface of the middle portion of the valve body 48 and the circular portion 47b of the bellows 47a. The cup shape portion 48d is bodily fixed to the front end of the front portion of the valve body 48 and is axially movably fit in the recess 8g.

The output member 41 is interposed between the piston 8 and the first piston 22, so that the piston 8 transmits the rearward movement of the diaphragm 4 to the first piston 22 through the output member 41. The output member 41 is formed at the rear end thereof with a flange 41d in the recess 8g. A rod portion 41a of the output member 41 extends forward through the bottom of the recess 8g and is connected in the rear hole 75 to the rear end of the piston rod 22a by means of a universal joint 77. The flange 41d has an annular projection 41b that projects forward at the periphery thereof, and is axially movably fit in the cup shape portion 48d of the valve body 48 in the recess 8g. An annular push member 51 is axially movably fit in the annular projection 41b at the rear portion thereof and is fit in the cup shape portion 48d at the front portion thereof with the forward movement of the annular push member 51 relative to the cup shape portion 48d being restricted. The cup shape portion 48d, the annular projection 41b and the annular push member 51 are axially movably fit in an annular recess 8a that is formed in the front portion 81 to extend forward from the bottom surface of the recess 8g. A return spring 42 is interposed between the rear shell 3 and the flange formed on the front portion 81 so as to urge the piston 8 forward.

A reaction force generating device 44 is interposed between the piston 8 and the output member 41 to make reaction force act on a valve body 48 of a control valve 46. The reaction force generating device 44 has an annular reaction force member 45 made of an elastic material that is received in an annular reaction force chamber 41c formed between the rod portion 41a and the annular projection 41b. The reaction force member 45 is interposed between a reaction force end surface 8b formed on the bottom of the recess 8g and the bottom surface of the reaction force chamber 41c.

(Operation of the Second Embodiment)

The operation of the master cylinder apparatus as constructed above will be described hereinafter. When the brake pedal 43 is stepped on forward, the brake pedal 43 is swiveled around the pin 54 to pull the pull rod 53 whereby the valve body 48 is moved rearward relative to the piston 8 against the resilient force of the compression spring 49 and 57. The air valve portion 48a is forced to come off the air valve seat 47e of the valve seat member 47, so that the atmospheric air that is filtered by the air filter 58 flows into the variable pressure chamber 6 through the hole 8e. In response to the pressure difference between the variable-pressure chamber 6 and the constant-pressure chamber 5, the diaphragm 4 and the piston 8 is moved rearward. The output member 41 is moved rearward by the piston 8 through the reaction force generating device 44, so that the first piston 22 is pulled by the output member 41.

The first and second pistons 22, 23 are moved rearward to increase the pressure of the operating fluid within the first and second fluid pressure chambers 24 and 28, so that the increased fluid pressure is supplied from ports 61, 62 to the first and second brake systems.

The piston 8 elastically deforms the reaction force member 45 with the force whose strength corresponds to the difference between the pressures acting on the both surfaces of the diaphragm 4. When the piston 8 pulls the output member 41 with the force that meets the stepping force exerted on the brake pedal 24, the air valve seat 47e is brought into abutment with the air valve portion 48a thereby to block the fluid communication of the variable-pressure chamber 6 with the atmosphere, whereby the braking pressure is maintained at a value depending on the force exerted on the brake pedal 24.

At the same time with this, the force with which the brake pedal 24 is stepped on is transmitted to the reaction force member 45 from the cup shape portion 48d and the annular push member 51. Since this causes the reaction force member 45 to be deformed in dependence on the pedal stepping force, the driver can feel the reaction force.

When the brake pedal 43 is released, the valve body 48 is moved forward by the force of the compression spring 49, 57 relative to a piston 8 to bring the air valve portion 48a into abutment with the air valve seat 47e and to separate the negative pressure valve seat 47d from the negative pressure valve portion 8d. This permits the negative pressure within the constant-pressure chamber 5 to be led to the variable-pressure chamber 6 via the passage 8f and the hole 8e, whereby the pressure difference between the variable-pressure chamber 6 and the constant-pressure chambers 5 is lost. The piston 8 and the diaphragm 4 are moved forward by the force of the return spring 42, and the first and second pistons 22, 23 are moved forward by the force of the first and second compression spring 31, 33 to depressurize the first and second fluid pressure chambers 24, 28.

The valve body 48 is stopped from moving forward when the stop member 50 fixed to the pull rod 53 is brought into abutment with the rear surface of cylindrical projection 3a of the rear shell 3, and this brings the negative pressure valve portion 8d into abutment with the negative pressure valve seat 47d, whereby the fluid communication between the constant-pressure chamber 5 and the variable pressure chamber 6 is shut off.

In the master cylinder apparatus, the front shell 2 of the booster shell 1 is in abutment with the rear surface of the installation flange 20a to be air-tightly secured thereto by nuts 72 engaging with male screws 70b formed on tie-rods 70 that is secured to the front shell 2 and join the front shell 2 and a rear shell 3 to form the booster shell 1, and the installation flange 20a is attached to the dashboard 17 by nuts 73 engaging with the male screws 70b, whereby by means of the plural tie-rods 70 that joins the front and rear shells 2, 3 into the booster shell 1, the booster 1a is attached to the cylinder body 20, and the master cylinder apparatus with the booster is mounted on the dashboard 17.

Obviously, numerous modifications and variations of the present invention are possible in light of the above teachings. It is therefore to be understood that within the scope of the appended claims, the present invention may be practiced otherwise than as specifically described herein.

What is claimed to be secured by the Letters Patent of the United States is:

1. In a master cylinder apparatus with a booster comprising:
   a booster shell;
   a partition member dividing the interior of the booster shell into a variable-pressure chamber and a constant-pressure chamber;
   a piston attached to the partition member for transmitting the movement in a front-rear direction of said partition member responsive to the pressure difference between the variable-pressure chamber and the constant-pressure chamber, to an output member;
   a control valve disposed in the piston to regulate the communication of the variable-pressure chamber with the constant-pressure chamber and the atmosphere;
   a cylinder body provided with a cylinder that opens to an end thereof and an installation flange at the same end to which the booster is secured;
   a master piston slidably inserted in the cylinder and connected to the output member;
   a reaction force generating device interposed between the piston and the output member to make a reaction force act on a valve body of the control valve;
   pull means connected to a brake pedal at one end and to the valve body at the other end, and wherein:
   the installation flange is attached to a dashboard, so that the booster shell is disposed in one of a passenger room and an engine room and the cylinder body protrudes into the other room through an installation hole made through the dashboard.

2. A master cylinder apparatus with a booster in claim 1, wherein:
   a rear shell of the booster shell is in abutment with a front surface of the installation flange to be air-tightly secured thereto by nuts engaging with bolts fixed to the rear shell,
   an elastic seal member provided with peripheral loop portion surrounding the installation flange and the installation hole for fluid-tightly sealing the installation hole is interposed between the rear shell and the dashboard, and
   the installation flange is attached to the dashboard by nuts engaging with the bolts.

3. A master cylinder apparatus with a booster in claim 2, wherein:
   a reservoir pipe secured to a reservoir of the master cylinder extends air-tightly to the atmosphere through the peripheral loop portion of the seal member.

4. A master cylinder apparatus with a booster in claim 1, wherein:
   a front shell of the booster shell is in abutment with a rear surface of the installation flange to be air-tightly secured thereto by nuts engaging with male screws formed on tie-rods that is secured to the front shell and join the front shell and a rear shell to form the booster shell, and
   the installation flange is attached to the dashboard by nuts engaging with the male screws.

5. A master cylinder apparatus with a booster comprising:
   a booster shell;
   a partition member dividing the interior of the booster shell into a variable-pressure chamber and a constant-pressure chamber;
   a piston attached to the partition member for transmitting the movement in a front-rear direction of said partition member responsive to the pressure difference between the variable-pressure chamber and the constant-pressure chamber, to an output member of the booster;
   a control valve diposed in the piston to regulate the communication of the variable-pressure chamber with the constant-pressure chamber and the atmosphere;
   a cylinder body provided with a cylinder opening to a front surface of the cylinder body to which the booster shell is air-tightly fixed;

a master piston slidably inserted in the cylinder and having the front end in abutment with the rear end of the output member;

a reaction force generating device interposed between the piston and the output member to make a reaction force act on an input portion formed bodily on a valve body of the control valve;

pull means disposed in parallel to the axis of the cylinder body to be connected to a brake pedal at one end and to penetrate into the constant-pressure chamber at the other end; and a balancing member disposed in the constant-pressure chamber in a diametrical direction of the booster shell to be connected to the input portion and to the other end of the pull means.

6. A master cylinder apparatus with a booster as set forth in claim 5, wherein:

the balancing member is disposed close to the piston to make a distance small between a rear surface of the piston exposed to the constant-pressure chamber and a front surface of the balancing member.

7. A master cylinder apparatus with a booster in claim 5, wherein:

the balancing member is provided with a spherical surface at the center portion thereof for making tiltable abutment with a spherical surface formed at the end portion of th input portion to restrain the rearward movement of the balancing member relative to the input portion.

8. A master cylinder apparatus with a booster as set forth in claims 5, wherein:

a resilient member is interposed between the rear surface of the piston and the front surface of the balancing member for urging the balancing member rearward to keep the balancing member in a normal position.

* * * * *